United States Patent [19]

Morita

[11] Patent Number: 4,816,808

[45] Date of Patent: Mar. 28, 1989

[54] FIRE ALARM SYSTEM

[75] Inventor: Toshikazu Morita, Tokyo, Japan

[73] Assignee: Nohmi Bosai Kogyo Kabushiki Kaisha, Tokyo, Japan

[21] Appl. No.: 92,923

[22] PCT Filed: Mar. 27, 1987

[86] PCT No.: PCT/JP87/00192

§ 371 Date: Jul. 7, 1987

§ 102(e) Date: Jul. 7, 1987

[87] PCT Pub. No.: WO87/06750

PCT Pub. Date: Nov. 5, 1987

[30] Foreign Application Priority Data

Apr. 23, 1986 [JP] Japan ................................ 61-94153

[51] Int. Cl.⁴ ........................ G08B 26/00; G05B 23/02

[52] U.S. Cl. .................................... 340/518; 340/505; 340/825.12

[58] Field of Search ............... 340/518, 505, 506, 508, 340/825.06–825.13, 825.21, 825.54, 825.52

[56] References Cited

U.S. PATENT DOCUMENTS

| | | | |
|---|---|---|---|
| 4,616,223 | 10/1986 | Naaijer | 340/825.07 |
| 4,658,243 | 4/1987 | Kimura et al. | 340/825.08 |
| 4,683,531 | 7/1987 | Kelch et al. | 340/825.08 |

*Primary Examiner*—Donnie L. Crosland

*Attorney, Agent, or Firm*—Wenderoth, Lind & Ponack

[57] ABSTRACT

In a fire alarm system wherein a receiver polls terminal devices having CPU's, such as fire detectors, fire sensors and repeaters, and the receiver reads monitoring information called from the terminal device or transmits control information thereto; a fire alarm system constructed so that each of said terminal devices having a CPU brings said CPU included therein into a standby status when a polling address of said receiver and an intrinsic address of said terminal device are different.

2 Claims, 4 Drawing Sheets

FIRE ALARM SYSTEM

TECHNICAL FIELD

The present invention relates to a fire alarm system, and more particularly to a fire alarm system wherein a receiver polls terminal devices having CPU's, such as fire detectors, fire sensors and repeaters and wherein the receiver reads monitoring information from the terminal device called or transmits control information thereto.

BACKGROUND ART

In a fire alarm system, the function thereof needs to be maintained for several hours even under conditions of a power failure, and emergency bells need to be sounded for a fixed period of time in case of the outbreak of a fire during the power failure. Therefore, a receiver has a built-in emergency power source (storage battery).

In a polling type fire alarm system, terminal devices to be polled by the receiver, such as fire detectors, fire sensors and repeaters have built-in CPU's, the consumption currents of which are not negligibly small. Accordingly, when the CPU's are always held in an operating status, the emergency power source of the receiver must have a large capacity.

It can therefore be considered to curtail wasteful power consumption, in cases where a signal transferred from the receiver or any of the other terminal devices is flowing on a signal line, and in cases where, e.g., the operations of reading and sending fire information from the fire detecting portions (detectors or sensors), fire detectors etc. (repeaters), or the operations of delivering control signals to devices to-be-controlled such as local bells and smoke control equipment, by switching the CPU's built in the terminal devices such as fire detectors from a wait status (under which the arithmetic portion of the CPU's are in standby status) into a run status (under which the arithmetic portion of the CPU's are in an operating status).

Even with this measure, however, the CPU's built in the terminal devices are in a run status while the signal is flowing on the signal line, and in the whole system, the large number of built-in CPU's operate simultaneously during the transmission time of the signal. This leads to the problem that the consumption currents during this time are great.

DISCLOSURE OF THE INVENTION

The present invention has been made in view of the background stated above, and has for its object to provide, in a fire alarm system wherein terminal devices such as fire detectors, fire sensors and repeaters have CPU's, respectively, and wherein a receiver polls the terminal devices so as to read monitoring information from a called terminal device or transmits control information thereto, a fire alarm system which can greatly curtail the consumption current of the whole system.

BEST MODE FOR CARRYING OUT THE INVENTION

Figure 1:
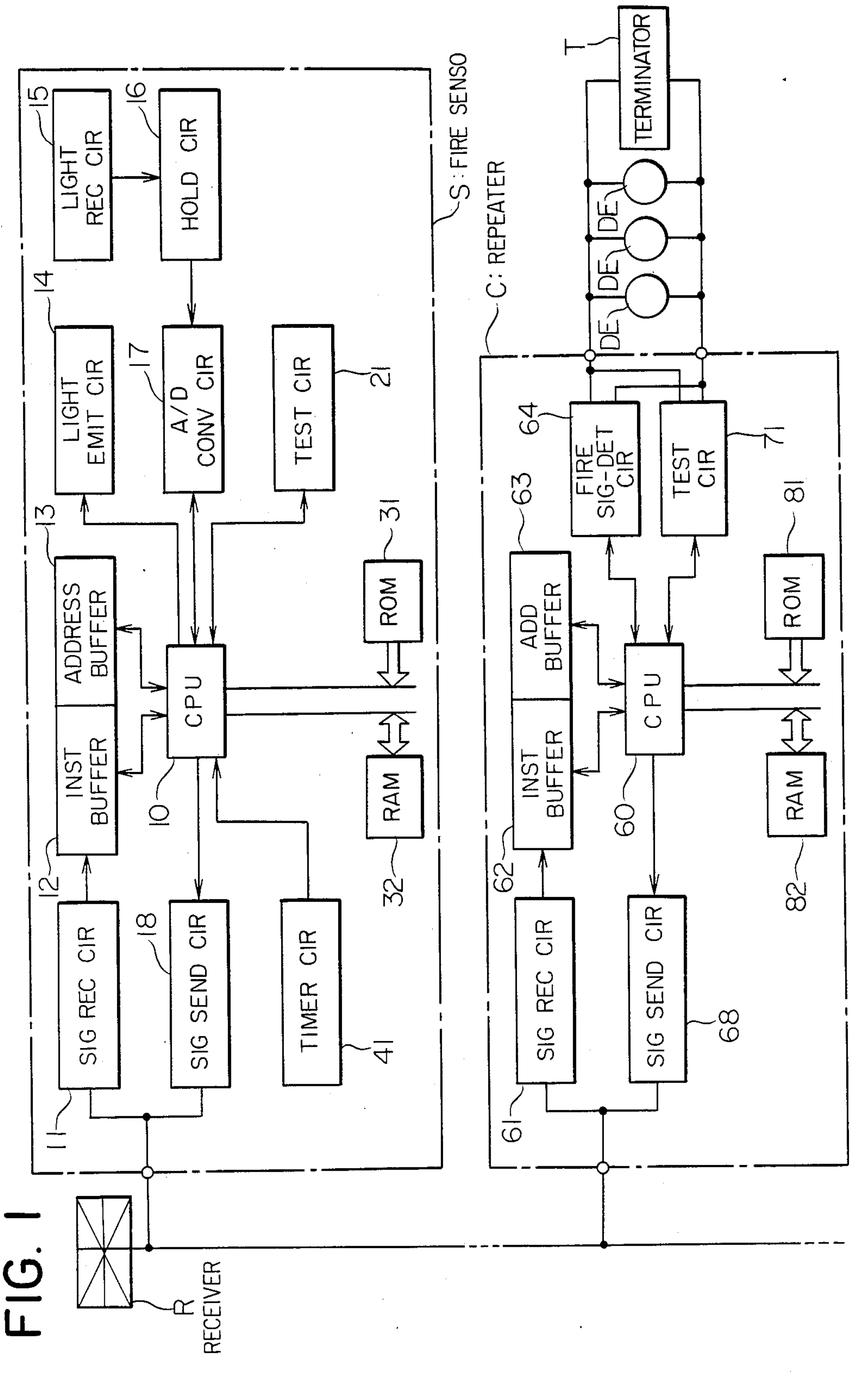
FIG. 1 is a block diagram showing an embodiment of the present invention.

FIG. 1 is a block diagram showing an embodiment of the present invention.

The embodiment is equipped with a single receiver R, a plurality of fire sensors S and a plurality of repeaters C. In addition, each repeater C has a plurality of detectors DE and a terminator T connected thereto.

The fire sensors S includes a CPU 10 which controls the entire fire sensor S, a signal receiver circuit 11, an instruction buffer 12 which holds an instruction from the receiver R, an address buffer 13 which holds an address from the receiver R, a light emitting circuit 14, a light receiving circuit 15 which receives light from the light emitting circuit 14, and a holding circuit 16 which holds the output signal of the light receiving circuit. Incidentally, the signal receiving circuit 11 and the buffers 12, 13 constitute transmission signal-receiving means.

Besides, the fire sensor S includes an A/D conversion circuit 17 by which an analog signal from the holding circuit 16 is converted into a digital signal, a signal sending circuit 18 which sends the output signal of the A/D conversion circuit 17, etc. to the receiver R, a test circuit 21 which tests the fire sensor S itself, a ROM 31 in which the program of the CPU 10 is stored beforehand, and a RAM 32 which stores predetermined data etc. temporarily.

The CPU 10 has the functions of comparing an intrinsic address proper of the fire sensor S, with an address received from the receiver R, and bringing the arithmetic portion of the CPU 10 in the corresponding fire sensor S into a standby status when both the addresses differ.

An example of the test circuit 21 is one which increases the quantity of light emission of the light emitting circuit 14 and tests whether or not the output of the light receiving circuit 15 on that occasion lies within a predetermined level range.

The repeater C includes a CPU 60 which controls the entire repeater C, a signal receiving circuit 61, an instruction buffer 62 which temporarily holds an instruction received from the receiver R, an address buffer 63 which temporarily holds an address received from the receiver R, and a fire signal-detecting circuit 64 which detects a fire signal from the fire detector DE. Incidentally, the signal receiving circuit 61 and the buffers 62, 63 constitute transmission signal-receiving means.

Besides, the repeater C includes a test circuit 71 which monitors the breaking of lines between the repeater C and the fire detectors DE, a signal sending circuit 68 by which a signal from the fire signal-detecting circuit 64 or the test circuit 71, etc. are sent to the receiver R, a ROM 81 in which the operation program of the CPU 60 is stored beforehand, and a RAM 82 which temporarily holds data etc.

The CPU 60 has the functions of comparing an intrinsic address of the repeater C, with an address sent from the receiver R, and bringing the arithmetic part of the CPU 60 in the corresponding repeater C into a standby status when both the addresses differ.

In a case where the terminator T is a resistor, the line monitoring by the test circuit 71 is to normally monitor a current flowing through the circuit.

Next, the operation of the embodiment will be described.

Figure 2:
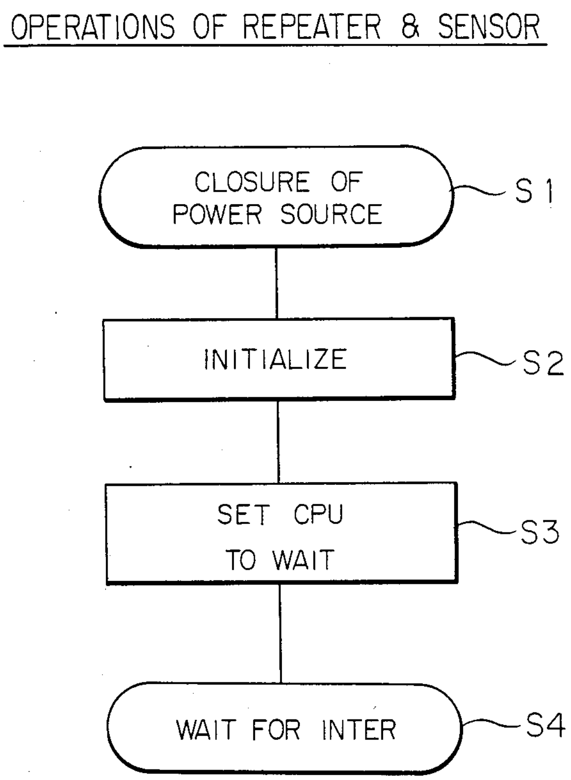
FIG. 2 is a flow chart showing the major operations of a repeater or a sensor in the embodiment.

FIG. 2 is a flow chart which indicates the basic operations of a repeater C or a fire sensor S.

First, a power supply is switched on (S1), and various initial values are set in the repeater C or fire sensor S (S2). After the initialization has ended, the CPU 10 or 60 is brought into a wait status (that is, the arithmetic portion in the CPU 10 or 60 is brought into the standby status) (S3). Then, an interruption is awaited (S4).

Figure 3:
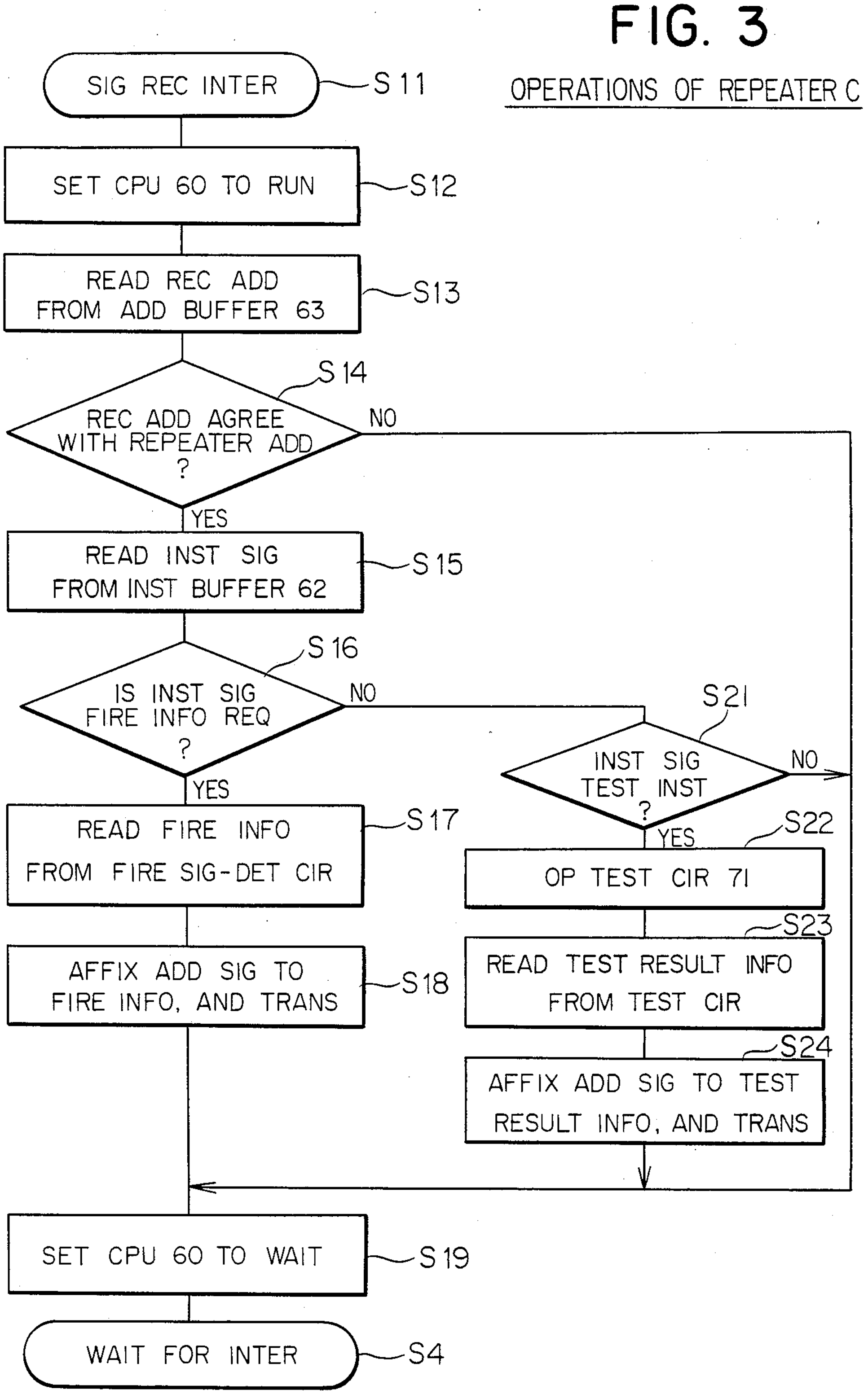
FIG. 3 is a flow chart showing the operations of the repeater in the embodiment.

FIG. 3 is a flow chart which indicates the operations of a repeater C.

When there is a receive interruption from the address buffer 63 (S11) while a receive interruption is being awaited in FIG. 2 (S4), the CPU 60 is set into a run status (the arithmetic portion of the CPU 60 is set into an operating status) (S12). Subsequently, the received address is fetched from the address buffer 63 (S13). If it agrees with the address of the repeater C itself (S14), an instruction signal is fetched from the instruction buffer 62 (S15), and it is determined whether or not fire information is being requested (S16).

In a case where the fire information is requested, it is read out from the fire signal-detecting circuit 64 (S17), and this fire information has the address of the repeater C affixed thereto and is transmitted to the receiver R (S18). Then, the CPU 60 is set into the wait status again (S19) so as to await an interruption (S4).

On the other hand, if the address in the received signal and the address of the repeater C are different (S14), the CPU 60 is immediately set into the wait status (S19).

Besides, in a case where the alarm information is not requested (S16), whether or not the fetched instruction signal is a test instruction is determined (S21). If the instruction signal is a test instruction, the test circuit 71 is operated (S22), test result information is read from the test circuit 71 (S23), the test result information has the address signal of the repeater C affixed thereto and is transmitted to the receiver R (S24), and the CPU 60 is set into the wait status (S19).

In this manner, when the address in the signal from the receiver R differs from the intrinsic address proper of the repeater C, the arithmetic portion of the CPU 60 in the particular repeater C is immediately brought into the standby status. Thus, power consumption can be saved to that extent.

Figure 4:
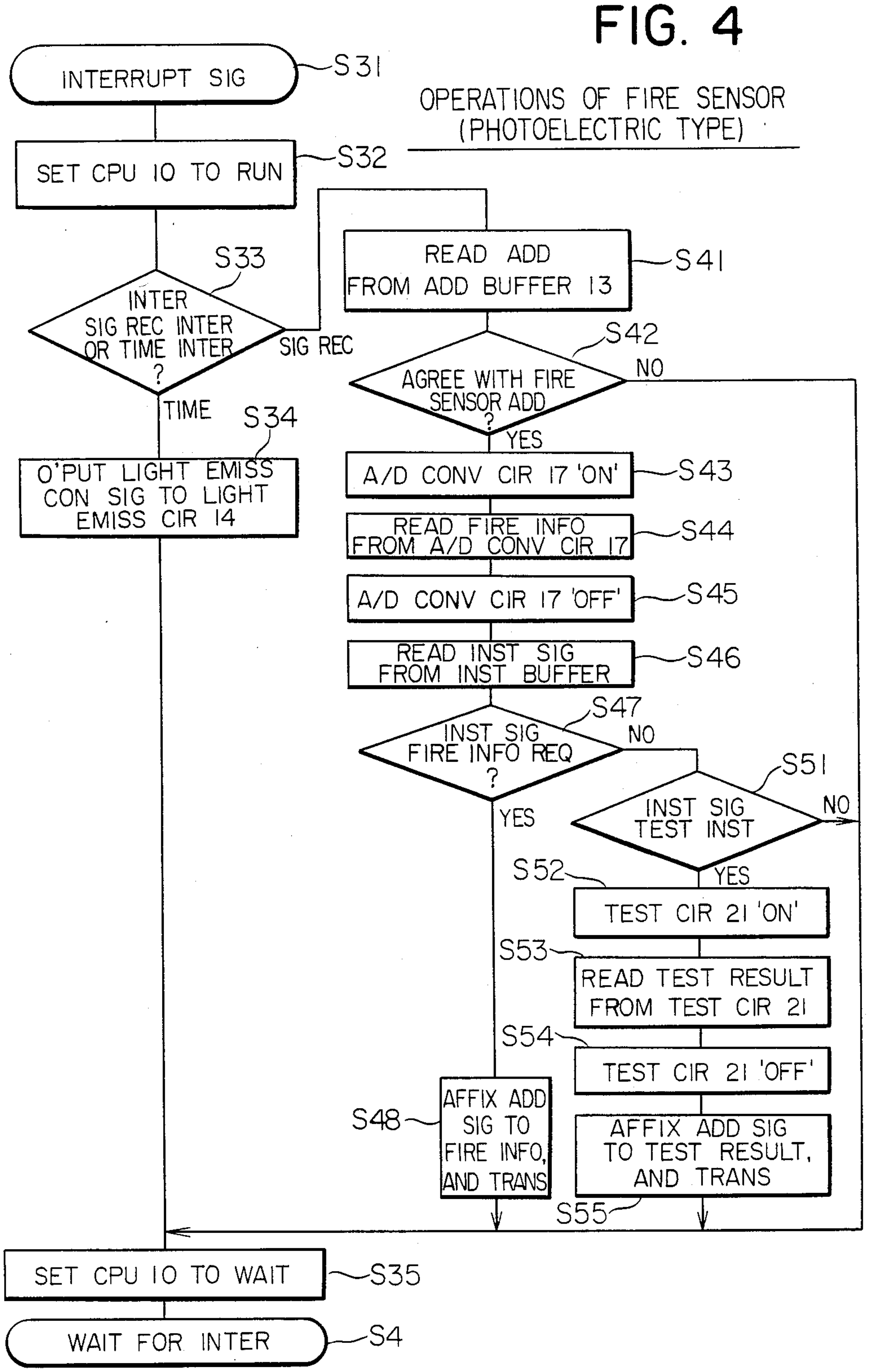
FIG. 4 is a flow chart showing the operations of the fire sensor in the embodiment.

FIG. 4 is a flow chart which indicates the operations of a fire sensor (of the photoelectric type) S.

When there is an interruption signal (S31) during the interruption wait status in FIG. 2 (S4), the CPU 10 is set into a run status (S32), and whether the interruption signal is a signal receive interruption from the address buffer 13 or a time interruption from a timer circuit 41 is determined (S33).

In case of a time interruption, a light emission control signal is delivered to the light emitting circuit 14 (S34), whereupon the CPU 10 is immediately brought into a wait status (the arithmetic portion of the CPU 10 is brought into a standby status) (S35). Subsequently, the CPU 10 is made ready for an interruption (S4).

On the other hand, in case of a signal receive interruption (S33), the address signal in the received signal is read from the address buffer 13 (S41). Whether or not the address is an intrinsic address of the alarm sensor S is determined (S42) and when both the addresses agree, the A/D conversion circuit 17 is turned 'on' (S34), and the fire information with the output of the holding circuit 16 converted into a digital signal is fetched from the A/D conversion circuit 17 (S44), whereupon the A/D conversion circuit 17 is turned 'off' (S45). The instruction signal is fetched from the instruction buffer 12 (S46), and whether or not it is a fire information request instruction is determined (S47).

If fire information is being requested, it has the intrinsic address proper signal of the fire sensor S affixed thereto and is transmitted to the receiver R (S48), and the CPU 10 is immediately brought into the wait status (S35).

If fire information is not being requested (S47), it is determined whether or not the signal is a test instruction (S51). If it is a test instruction, the test circuit 21 is turned 'on' (S52), a test result is read from the test circuit 21 (S53), and the test circuit 21 is turned 'off' (S54). The test result has the intrinsic address signal of the fire sensor S affixed thereto and is transmitted to the receiver R (S55), and the CPU 10 is immediately brought into the wait status (S35).

In this manner, even for the fire sensor S, when the address signal of the received signal differs from the intrinsic address proper signal of the particular fire sensor S, the arithmetic part of the CPU 10 is brought into the standby status, whereby power consumption during the period of the standby status can be reduced.

Accordingly, the CPU's built in the plurality of fire detectors etc. perform simultaneous operations only immediately after an address signal flows through the signal line, and only for a short time for determining whether or not the addresses agree.

According to the present invention, the operation of CPU's disposed in terminal devices are limited to the minima so as to lessen consumption currents. Therefore, the invention has the effect that the consumption current of the whole system can be curtailed in a large amount.

What is claimed is:

1. A fire alarm system wherein a receiver polls terminal devices each have a CPU, said terminal devices including at least one of fire directors, fire sensors and repeaters, and wherein said receiver reads monitoring information called from said terminal devices or transmits control information thereto; wherein each of said respective terminal devices include:

- a transmission signal-receiving means for receiving signals from said receiver;
- a determining means for determining whether or not a polling address received by said transmission signal-receiving means coincides with a self-address of the terminal device; and
- a waiting state set means for setting the CPU in the terminal device to a waiting state when a non-coincidence between said polling address and said self address is determined by said determining means.

2. A fire alarm system as defined in claim 1, wherein each of said transmission signal-receiving means includes an interruption signal output means for outputting a received interruption signal when an address signal is received, said CPU of its corresponding terminal device being set to an operating state by said received interruption output signal output from said interruption signal output means.

* * * * *